United States Patent [19]

Okazaki et al.

[11] Patent Number: 5,458,964

[45] Date of Patent: Oct. 17, 1995

[54] BIAXIALLY ORIENTED FILM COMPRISING ORGANIC PARTICLES

[75] Inventors: Iwao Okazaki, Kyoto; Masahiro Kimura, Otsu; Masatoshi Aoyama, Mishima; Masaru Suzuki, Ito; Koichi Abe, Kyoto; Yukari Nakamori, Shiga; Hidehito Minamizawa, Otsu; Katsuya Okamoto, Hirakata; Hiroyuki Tanaka, Otsu, all of Japan

[73] Assignee: Toray Industries, Inc., Tokyo, Japan

[21] Appl. No.: 104,759

[22] Filed: Aug. 12, 1993

[30] Foreign Application Priority Data

| Aug. 12, 1992 | [JP] | Japan | 4-215138 |
| Oct. 19, 1992 | [JP] | Japan | 4-279983 |
| Oct. 19, 1992 | [JP] | Japan | 4-279984 |
| Jan. 19, 1993 | [JP] | Japan | 5-006583 |
| Jan. 19, 1993 | [JP] | Japan | 5-006584 |

[51] Int. Cl.$^6$ .................................................. B32B 5/16
[52] U.S. Cl. ...................... 428/323; 428/327; 428/329; 428/331; 428/480; 428/910
[58] Field of Search .................................. 428/327, 323, 428/329, 331, 480, 910

[56] References Cited

U.S. PATENT DOCUMENTS

| 4,320,207 | 3/1982 | Watanabe et al. | 521/54 |
| 4,320,207 | 3/1982 | Watanabe | 521/54 |
| 4,568,616 | 2/1986 | Seifried et al. | 428/480 |
| 5,032,458 | 7/1991 | Dallmann et al. | 428/423.7 |
| 5,069,962 | 12/1991 | Okazaki et al. | 428/323 |
| 5,096,773 | 3/1992 | Sakamoto | 428/323 |
| 5,100,719 | 3/1992 | Endo et al. | 428/213 |
| 5,270,096 | 12/1993 | Kato et al. | 428/143 |

FOREIGN PATENT DOCUMENTS

| 59-5216 | 3/1984 | Japan . |
| 2-77431 | 3/1990 | Japan . |
| 2-155948 | 6/1990 | Japan . |

*Primary Examiner*—D. S. Nakarani
*Assistant Examiner*—H. Thi Lê
*Attorney, Agent, or Firm*—Fish & Richardson

[57] ABSTRACT

Disclosed is a biaxially oriented film and a laminated film containing specified organic particles at a content of 0.001 to 20% by weight. The strength when deformed by 10% ($S_{10}$) of the organic particles is in the range of 3 to 30 kgf/mm$^2$, the thermal decomposition temperature for causing 10% loss in weight thereof is not lower than 350° C. The weight average diameter thereof is in the range of 0.005 to 5 μm. Since the organic particles have a good affinity with the matrix resin of the film and a good thermal resistance and the hardness of the particles is appropriate, desired protrusions hardly chipped and having an appropriate hardness for hardly scratching a magnetic surface can be formed on a film surface easily and uniformly. Therefore, a film excellent in abrasion resistance and scratch resistance at a high running speed and excellent in running durability can be obtained, which is useful particularly as a base film of a magnetic tape.

18 Claims, 1 Drawing Sheet

FIG. 1

BIAXIALLY ORIENTED FILM COMPRISING ORGANIC PARTICLES

BACKGROUND OF THE INVENTION

1. Field of the Invention

The present invention relates to a biaxially oriented film which is hardly scratched at surface and which is excellent in abrasion resistance and scratch resistance of magnetic surface at a high running speed when it is processed into a magnetic recording medium.

2. Description of the Prior Art

Generally, a thermoplastic polyester, for example, polyethylene terephthalate, has excellent mechanical properties and chemical properties, and is broadly used for a formed product such as a film or a fiber. When a thermoplastic polyester is processed into and used as a formed product, the slipping property and the abrasion resistance thereof greatly affect the working ability in the production process or in the processing processes for various uses. For example, when the polyester is used as a base film of a magnetic tape, if these properties are insufficient, the friction between a coating roll and the film in the production process for the magnetic tape becomes large, wrinkles and scratches are likely to occur in the film. Further, the powders abraded from the film are liable to occur, and missing of coating occurs in the process for coating a magnetic layer, and as a result, missing of magnetic record (drop out) is likely to occur. Further, recently a problem has been pointed out that a magnetic surface is scratched by contact of the magnetic surface and a non-magnetic surface in a winding process after coating of a magnetic material and calendering and the scratches cause reduction of image quality such as drop out when used as a product.

As a conventional method for improving the slipping property of a film, a method for containing inorganic particles such as titanium dioxide, calcium carbonate or silicon dioxide particles in the polyester is proposed in many disclosures. However, since these inorganic particles are hard and poor in the affinity with polyester, for example, when the polyester is used as a film and an external force caused by a calendering in a magnetic layer coating process, a contact with a roll during running of the film or a contact between the surfaces of the film in winding is applied to the film, the particles easily fall off from the film and this causes occurrence of chipped substances, deterioration of the slipping property and occurrence of wrinkles on the film surface. Moreover, because the fallen particles themselves are hard, the chipped substances and the wrinkles on the film surface increase multiplicatively as time passes. Thus, when the amount of the chipped substances increases and the wrinkles occur on the film surface, missing of coating in a magnetic layer coating process and drop out are liable to occur. Further, a dirt of a calender roll in the process for coating a magnetic layer remarkably deteriorates the working ability in the production of a magnetic recording film. Thus, such scratches and poor abrasion resistance caused by the fact that particles such as inorganic particles, which are hard and poor in the affinity with polyester, are likely to directly receive an external force, have been desired to be improved.

As a method for improving the affinity of particles with polyester, a method for treating the surfaces of inorganic particles or a method for using organic particles are proposed. As the surface treatment of inorganic particles, for example, the surface treatment by polyacrylic acid polymers is proposed in JP-A-SHO 63-128031, the surface treatment by a phosphorus compound is proposed in JP-A-SHO 62-235353 and 63-234039, the surface treatment by a coupling agent is proposed in JP-A-SHO 62-223239 and 63-312345, the surface treatment by a silane compound is proposed in JP-A-SHO 63-304038, and the surface treatment by the graft due to glycol is proposed in JP-A-SHO 63-280763, respectively. However, it is difficult to stand both of an appropriate hardness and a good affinity of the particles, and a sufficient abrasion resistance cannot be obtained by these methods. As the organic particles, crosslinked polymeric particles are proposed in, for example, JP-B-SHO 63-45409, JP-A-SHO 59-217755 and JP-A-HEI 2-189359, respectively. However, the particles proposed by these methods do not have specified strength and degree of crosslinkage, and even if these methods are employed, a sufficient abrasion resistance at a high running speed cannot be obtained.

As a biaxially oriented thermoplastic resin film used for magnetic recording media, a laminated film, wherein a layer containing inorganic or organic particles is laminated on at least one surface of a film and the relationship between the diameter of the particles and the thickness of the laminated layer is specified, thereby improving the handling ability, the running ability and the abrasion resistance, is known (JP-A-HEI-2-77431). In such a film, because protrusions having a uniform height are formed on the film surface, it is possible to remarkably decrease the damage to a magnetic surface such as the transfer of the shape of excessive large protrusions to the magnetic surface in curing process or the thrust up due to the protrusions in calendering process. Particularly, such a film is suitable to a base film for a metal tape such as an 8 mm VTR tape or a business-use VTR tape.

Recently in magnetic tape makers, however, further cost down is planned, and a higher production speed or in a part of metal tapes, omission of a backcoat, which has been provided on a running surface of a conventional tape, is investigated. In a case where a conventional base film for a metal tape is made as a backcoatless film, when the fast feed/rewind (FF/REW) operation is repeatedly carried out, there occurs a problem that the running surface of the film is scratched or that the drop out increases by generation of chipped powder. In particular, because the speed of the FF/REW is expected to be increased in the future, it will become extremely important to further increase the running durability of the surface of a base film.

SUMMARY OF THE INVENTION

The inventors of the present invention found that the abrasion resistance and the scratch resistance of magnetic surface at a high running speed of a film can be greatly improved by using organic particles having a specified hardness or crosslinked organic particles having a specified hardness and a high degree of crosslinkage.

Accordingly, an object of the present invention is to provide a biaxially oriented film excellent particularly in abrasion resistance at a high running speed and scratch resistance of magnetic surface at a high running speed.

Another object of the present invention is to provide a biaxially oriented film which can prevent the abrasion of the surface of a base film, can suppress the increase of drop out and can maintain a running durability equivalent to that due to a backcoat even though the film runs repeatedly in a VTR.

To accomplish these objects and other objects, a biaxially oriented film according to the present invention contains organic particles, whose strength when deformed by 10% ($S_{10}$) is in the range of 3 to 30 kgf/mm², whose thermal decomposition temperature for causing 10% loss in weight is not lower than 350° C. and whose weight average diameter is in the range of 0.005 to 5 µm, at a content of 0.001 to 20% by weight.

In the biaxially oriented film according to the present invention, the contained organic particles have an appropriate hardness, that is, the particles are not too hard and are not too soft, because the strength of the particles when deformed by 10% ($S_{10}$) is in the range of 3 to 30 kgf/mm². Further, since the contained particles are organic particles, they have a good affinity with a matrix resin of the film. Therefore, the particles can form protrusions on the film surface, which do not easily fall down from the film surface and which can prevent the damage to a magnetic surface when used as a base film of a magnetic tape such as the transfer of the shape of large protrusions to the magnetic surface in curing process or the thrust up due to the protrusions in calendering process. Thus, good abrasion resistance and scratch resistance of magnetic surface at a high running speed can be obtained.

Further, the thermal resistance of the particles is maintained high because the thermal decomposition temperature for causing 10% loss in weight of the particles is not lower than 350° C. The agglomeration of the organic particles can be prevented and the protrusion forming ability of the organic particles can be ensured particularly at the time of film formation. Therefore, preferable protrusions can be surely formed and the size and height of the protrusions are controlled to be relatively uniform.

Furthermore, since the weight average diameter of the organic particles is controlled in the range of 0.005 to 5 µm, protrusions having an appropriate size and an appropriate height are uniformly formed on the film surface. Therefore, The film surface can have an excellent running durability as well as good abrasion resistance and scratch resistance of magnetic surface at a high running speed described above.

Such particles as described above are contained in the biaxially oriented film at a content of 0.001 to 20% by weight. Therefore, the desired protrusions are appropriately formed on the film surface.

DETAILED DESCRIPTION OF THE PREFERRED EMBODIMENTS OF THE INVENTION

Although the resin forming the biaxially oriented film according to the present invention is not particularly restricted, it is preferably a polyester. The polyester used for the biaxially oriented film according to the present invention is prepared from a dicarboxylic acid whose main acid constituent is an aromatic dicarboxylic acid and an ester-forming derivative thereof and a glycol. As the aromatic dicarboxylic acid in the present invention, for example, terephthalic acid, 2,6-naphthalene dicarboxylic acid, ethylene α, β-bis(2-chlorophenoxy)ethane-4,4'-dicarboxylic acid, diphenyldicarboxylic acid and isophthalic acid can be employed. As the glycol component in the present invention, for example, an aliphatic glycol such as ethylene glycol, butanediol, tetramethylene glycol or hexamethylene glycol or a cyclic diol such as cyclohexanedimethanol can be employed. As the polyester used in the present invention, for example, a polyester whose main constituent is alkylene terephthalate or alkylene naphthalate is preferred. The polyester may be any of homopolyester and copolyester. As the copolymerized component, for example, an aliphatic dicarboxylic acid such as adipic acid or sebacic acid, a cyclic dicarboxylic acid such as hexahydroterephthalic acid or hexahydroisophthalic acid, polyethylene glycol, polypropylene glycol or 5-sodium sulfoisophthalic acid can be employed. Particularly, it is desired to copolymerize a compound having a sulfonic group or a sulfonate at a content of 0.1 to 5% by weight, preferably 0.1 to 3% by weight to improve the dispersion property.

In the biaxially oriented film according to the present invention, organic particles are contained. As the organic particles, crosslinked organic particles, in more detail, crosslinked organic polymeric particles are preferred. Crosslinked organic polymeric particles in the present invention are not particularly restricted. Any particle at least a part of which is composed of a crosslinked polymer insoluble with polyester can be used. As the crosslinked organic polymeric particles, generally, a copolymer of a monovinyl compound (A) having only one aliphatic unsaturated bond in the molecule and a compound (B) having two or more aliphatic unsaturated bonds in the molecule which is used as a crosslinking component can be employed.

As examples of the compound (A) in the above copolymer, an aromatic monovinyl compound such as styrene, α-methylstyrene, fluorostyrene, vinyl pyridine or ethylvinylbenzene, a vinyl cyanide compound such as acrylonitrile or methacrylonitrile, an acrylate monomer such as methylacrylate, ethylacrylate, propylacrylate, butylacrylate, octylacrylate, dodecylacrylate, hexadecylacrylate, 2-ethylhexylacrylate, 2-hydroxyethylacrylate, glycydilacrylate or N,N'-dimethylaminoethylacrylate, a methacrylate monomer such as methylmethacrylate, ethylmethacrylate, propylmethacrylate, isopropylmethacrylate, butylmethacrylate, sec-butylmethacrylate, arylmethacrylate, phenylmethacrylate, benzilmethacrylate, 2-ethylhexylmethacrylate, 2-hydroxyethylmethacrylate, glycydilmethacrylate or N,N'-dimethylaminoethylmethacrylate, a mono- or dicarboxylic acid and an acid anhydride of dicarboxylic acid such as acrylic acid, methacrylic acid, maleic acid or itaconic acid, or an amide monomer such as acrylic amide or methacrylic amide can be employed. Particularly, styrene, ethylvinylbenzene and methylmethacrylate are preferably employed.

As examples of the compound (B), divinylbenzene compound, or trimethylolpropanetriacrylate or trimethylolpropanetrimethacrylate, or polyatomic acrylate or methacrylate such as ethylene glycol diacrylate, ethylene glycol dimethacrylate, polyethylene glycol diacrylate, polyethylene glycol dimethacrylate, 1,3-butylene glycol diacrylate, 1,3-butylene glycol dimethacrylate, trimethylolpropanetriacrylate or trimethylolpropanetrimethacrylate can be employed. Among these compounds (B), particularly divinylbenzene, ethylene glycol dimethacrylate or trimethylolpropanetrimethacrylate is preferably used.

With the crosslinked organic polymeric particles according to the present invention, a degree of crosslinkage of the particles relative to the whole of the organic components constituting the particles, which is defined by the following equation (1), is preferably not less than 60%.

Degree of crosslinkage=(weight of crosslinkage component in raw material monomer)/(total weight of raw material monomer)× 100 (%)     (1)

More preferably the degree of crosslinkage is not less than 70%, and further more preferably not less than 75% in order to further stabilize the form of the particles and improve the abrasion resistance at a high running speed.

With respect to the crosslinked organic polymeric particles according to the present invention, the strength of the particles when deformed by 10% (hereinafter, referred to as $S_{10}$) must be in the range 3 to 30 kgf/mm². If the strength $S_{10}$ is more than 30 kgf/mm², the particles themselves or fallen particles are likely to scratch a magnetic surface. On the other hand, if the strength $S_{10}$ is less than 3 kgf/mm², although the abrasion resistance of the film surface at a low running speed is good, the abrasion resistance at a high running speed for a long period of running time decreases. The strength $S_{10}$ is desired to be in the range of 4 to 25 kgf/mm² and preferably in the range of 5 to 20 kgf/mm² in order to particularly improve the abrasion resistance of a formed product.

Figure 1:
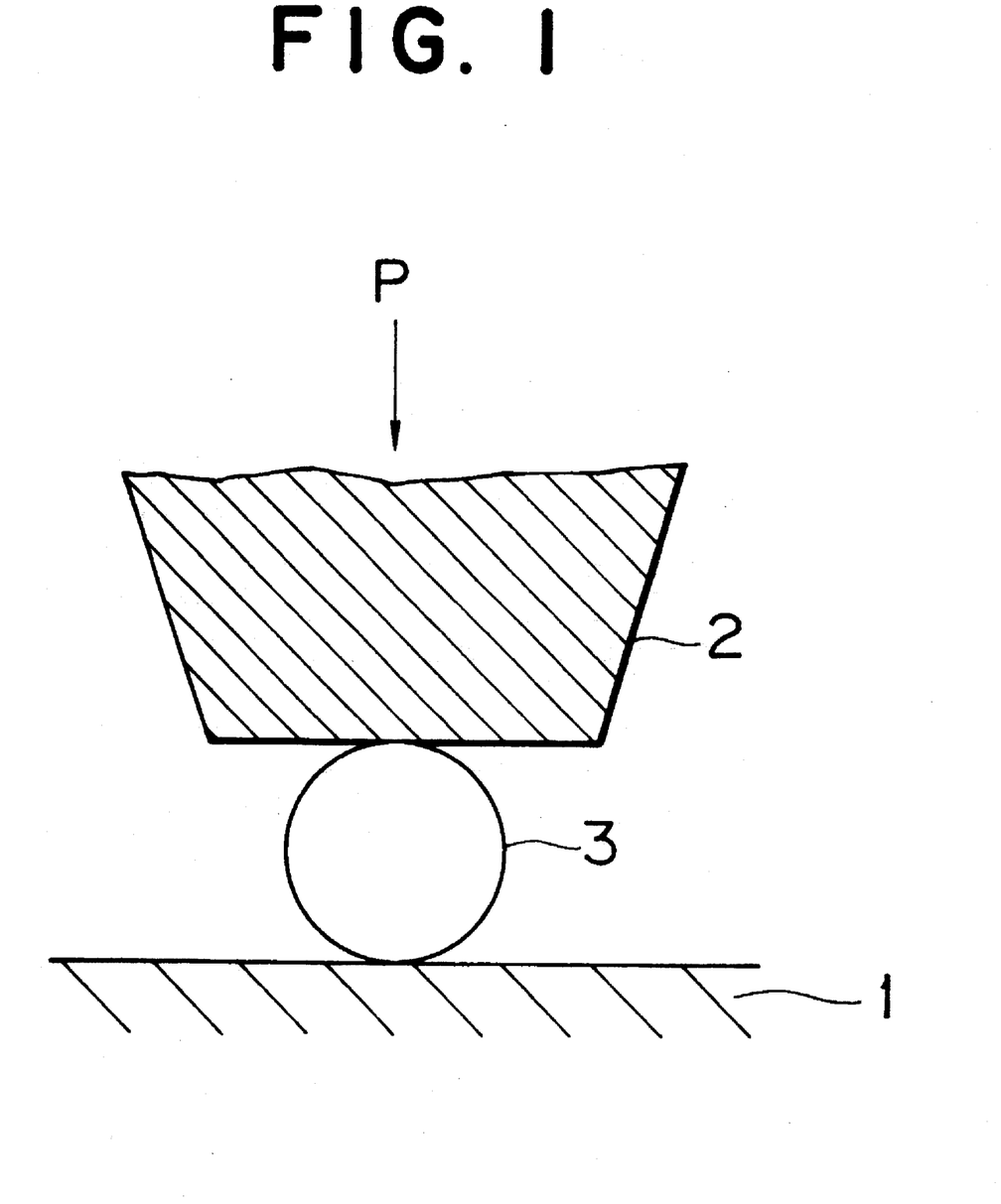
FIG. 1 is a schematic sectional view showing a method for measuring the strength of particles ($S_{10}$) according to the present invention.

Where, the $S_{10}$ of particles is an index for representing the hardness of the particles, and can be determined by, for example, measuring the deformation of the particle caused by an external force in a manner such as one shown in FIG. 1. In the method shown in FIG. 1, the particles are dispersed on a lower press indenter 1, and one fine particle 3 is fixed between an upper press indenter 2 and the lower press indenter 1. Then, a load is applied at a constant increasing rate, the deformation of the fine particle and the load are automatically measured, the $S_{10}$ is calculated from the load P (kgf) measured when the particle is deformed (smallened) by 10% relative to the maximum length before deformation in the direction of the application of the load, using the following equation (2). (This measurement is repeated ten times, and the average value is defined as the $S_{10}$.)

$$S_{10} = 2.8 \, P/\pi D^2 \, (kgf/mm^2) \qquad (2)$$

Where, "D" represents particle diameter (mm).

This $S_{10}$ can be determined on particles present in the polyester film. For example, the $S_{10}$ can be measured by dissolving the polyester by o-chlorophenol or an alkali, separating only the particles from the polyester and drying them and measuring in a manner similar to that described above.

Further, since it is difficult to measure the $S_{10}$ of a particle having a diameter of less than 0.5 μm, in the present invention, the $S_{10}$ of the particle is defined by measuring the $S_{10}$ of a particle having a diameter of 1 to 3 μm which has the same composition as that of the particle having a diameter of less than 0.5 μm.

In the present invention, the weight average diameter "d" of the crosslinked organic polymeric particles is in the range of 0.005 to 5 μm, preferably in the range of 0.01 to 3 μm, more preferably in the range of 0.1 to 2 μm. If the weight average diameter "d" is more than 5 μm, the protrusions formed on the film surface are too high, the particles are liable to fall from the film surface, and the scratch resistance, the abrasion resistance and the dubbing resistance (when the film is used as a base film of a magnetic recording medium) deteriorate. On the other hand, if the weight average diameter "d" is less than 0.005 μm, the height of the protrusions formed on the film surface are too small, the friction of the surface becomes large, and the running ability, the scratch resistance, the running durability and the dubbing resistance deteriorate.

As examples of the preferable composition for the crosslinked organic polymeric particles according to the present invention, for example, divinylbenzene polymer, ethylvinylbenzene-divinylbenzene copolymer, styrene-divinylbenzene copolymer, styrene-ethylvinylbenzene-divinylbenzene copolymer, ethylene glycol dimethacrylate polymer, styrene-ethylene glycol dimethacrylate copolymer and methylmethacrylate-divinylbenzene copolymer can be used. Further, the crosslinked organic polymeric particles may be composed of a composition having a three or more component system.

The process for producing the crosslinked organic polymeric particles according to the present invention will be explained. For example, there are processes for producing the particles by the following emulsion polymerizations after mixing compounds (A) and (B).

(a) soap free polymerization process: i.e., process for polymerizing without an emulsifier or using a very small amount of an emulsifier (b) seed polymerization process for adding polymer particles in a polymerization system prior to emulsion polymerization and thereafter emulsion polymerizing (c) core shell polymerization process for emulsion polymerizing a part of a monomer component and polymerizing the residual monomer in the polymerization system (d) polymerization process by the "ugel stat" disclosed in JP-A-SHO 54-97852 and JP-A-SHO 54-126288

(e) polymerization process without using an expanding agent in the above process (d)

In a case where the organic polymeric particles are composed of a silicone resin, the composition of not less than 80 wt % of the structural units of the particle is preferably trifunctional organopolysiloxane represented by $CH_3SiO_{3/2}$. In this organopolysiloxane, 80 wt % of the structural units has a three-dimensional bonding structure represented by $CH_3SiO_{3/2}$, and the degree of the polymerization thereof is preferred to be not less than 100 in order to achieve the advantages according to the present invention more efficiently.

Further, in order to give an appropriate specified hardness to the crosslinked organic polymeric particles, a metal element (in the long-period type periodic table, an element belong to I group except hydrogen, II group, III group except boron, IV group except carbon and silicon, VIII group, and the sub groups "a" of V, VI and VII groups) or silicon may be introduced into the particles in the production of the particles. As these metal elements and so forth, for example, an element such as Ca, Mg, Al, Zr, Ti, Fe, Zn, Si, Ge and Sb can be employed. The mole ratio of the element in the particle relative to carbon is in the range of 0.0001 to 1, preferably in the range of 0.001 to 0.8, and more preferably in the range of 0.01 to 0.6. These elements can be introduced at any process in the production of the particles. For example, a method for adding a compound containing the above element into the polymerization system of the particles and thereby containing the element in the particles can be used. However, the introduction method is not particularly restricted by this method. Further, even in a case where the particles are formed as composite particles of an organic component and an inorganic component such as the above metal elements and so forth, the degree of crosslinkage of the organic component in the particles is preferred to be not less than 60%.

The content of the crosslinked organic polymeric particles is in the range of 0.001 to 20.0% by weight relative to the total weight of the layer containing the particles, preferably in the range of 0.005 to 10.0% by weight, more preferably in the range of 0.01 to 8.0% by weight.

As the form of the crosslinked organic polymeric particles in a film, a form represented by a volume shape factor of 0.35 to 0.52 is preferred to ensure a good slipping property. The volume shape factor "f" is represented by the following equation (3).

$$f=V/D^3 \quad (3)$$

Where, V ( μm³) indicates the volume of a particle, and D indicates the maximum diameter (μm)of the particle in a plane of projection.

In order to stand both of a good affinity of the crosslinked organic polymeric particles with a polyester and a good dispersion property of the particles in the polyester, it is preferred that the surfaces of the particles are treated with a compound such as sodium methacrylate or sodium acrylate which has a low reactivity with polyester or which does not react with polyester. Although the method for the surface treatment is not particularly restricted, a method for firstly producing crosslinked organic polymeric particles as the matrix and thereafter adding a surface treatment agent and adsorbing the agent on the surface or reacting the agent with the surface is preferred from the viewpoint of the thermal resistance of the particles. For example, in the case of using sodium acrylate, styrene-ethylvinylbenzene-butylacrylate-divinylbenzene copolymer particles are produced as the matrix particles, and thereafter, styrene and acrylic acid are added and a part thereof is polymerized, and then, —COONa group originating from Na-methacrylate can be introduced into the surfaces of the particles by turning the system to alkali side. As the amount of the surface treatment agent, the range of 0.01–500 parts by weight, preferably 0.1–300 parts by weight, is desired relative to the matrix particles of 100 parts by weight.

With respect to the thermal resistance of the crosslinked organic polymeric particles according to the present invention, the thermal decomposition temperature measured by a thermobalance for causing 10% loss in weight is not lower than 350° C., preferably not lower than 360° C., and particularly preferably not lower than 380° C. In such a condition, the agglomeration of the particles can be efficiently prevented when the polyester composition is molten and formed or when a formed product is recycled. Therefore, the uniformity of the film surface and a good abrasion resistance can be ensured.

In the biaxially oriented film according to the present invention, it is preferred that agglomerated particles are contained in the film from the viewpoint of further improvement of the scratch resistance and the dubbing resistance. The primary particle diameter of the agglomerated particles is preferably in the range of 5 to 150 nm, more preferably in the range of 10 to 100 nm. Although the secondary particle diameter of the agglomerated particles is not particularly restricted, it is preferably in the range of 30 to 800 nm, more preferably in the range of 40 to 600 nm in order to further improve the scratch resistance and the dubbing resistance.

The content of the agglomerated particles is preferably in the range of 0.01 to 3% by weight, more preferably in the range of 0.05 to 2% by weight and particularly preferably in the range of 0.1 to 1% by weight, from the viewpoint of improvement of the scratch resistance and the dubbing resistance. If the content is more than 3% by weight, the dubbing resistance deteriorates, and if the content is less than 0.01% by weight, the improvement of the scratch resistance cannot be expected. Although the kind of the agglomerated particles is not particularly restricted, for example, alumina particles having a crystal form of δ-type, θ-type, η-type and γ-type, and zirconia, agglomerated silica and titanium dioxide particles can be used. Two or more kinds of these particles may be jointly used.

Although the biaxially oriented film according to the present invention has main components of the above polymer and the above organic particles, a different kind of polymer may be blended in a range which does not injure the object of the present invention, and an organic additive such as oxidation inhibitor, thermal stabilizer, lubricant or ultraviolet absorbent may be added by the volume generally employed.

The biaxially oriented film according to the present invention is a film formed by biaxially orientating the above-described composition. A uniaxially oriented film or a non-oriented film is not preferred because a good scratch resistance cannot be obtained. Although the degree of orientation of the biaxially oriented film is not particularly restricted, Young's modulus, which is an index of the molecular orientation of a polymer, is preferably not less than 350 kg/mm² in both longitudinal and transverse directions to further improve the scratch resistance. The upper limit of the Young's modulus, which is an index of the molecular orientation of a polymer, is generally about 1500 kg/mm² in production of the film.

Further, even if the Young's modulus of the film according to the present invention is in the above range, the film is preferred that in a part of the film in the thickness direction, for example, in a portion near the surface of the film, the molecular orientation of the polymer is not in a non-oriented or uniaxially oriented condition, that is, the molecular orientation of the polymer in the whole portions in the thickness direction is in a biaxially oriented condition, in order to further improve the scratch resistance and the dubbing resistance. Particularly, when the molecular orientation measured by an Abbe refractometer or a refractometer using a laser or determined by total reflection Raman spectroscopic analysis is determined to be biaxially oriented at both the surface and the back surface, further better scratch resistance and dubbing resistance can be obtained.

Furthermore, in the biaxially oriented film according to the present invention, the number of protrusions formed on at least one surface of the film is preferably in the range of $2\times10^3$ to $5\times10^5$/mm², more preferably in the range of $3\times10^3$ to $4\times10^5$/mm², further more preferably in the range of $5\times10^3$ to $3\times10^5$/mm², from the viewpoint of the scratch resistance and dubbing resistance.

Although the composition according to the present invention can be applied to both a single layer film and laminated film having a plurality of layers, a laminated film having at least one film layer with the composition aforementioned is preferred from the viewpoint of the running ability, running durability and abrasion resistance. Where, the "laminated film" means a film having at least two layers along the thickness direction, and three or more layer laminated film is, of course, included in the "laminated film". Further, in the laminated film, it is preferred that at least one outermost layer is composed of the biaxially oriented film according to the present invention from the viewpoint of the running ability and running durability. A laminated film both surfaces of which are composed of the biaxially oriented film according to the present invention is particularly preferred.

As the lamination structure of the laminated film, various formations are available. For example, in a case of two-layer laminated film, a simple two-layer lamination structure of the layer (layer A) containing organic crosslinked polymeric particles according to the present invention and another layer (layer B), a lamination structure wherein a coating layer (for example, a good adhesive layer) is provided on the layer A, a lamination structure wherein a coating layer (for example, a good adhesive layer) is provided on the layer B or a lamination structure wherein a back coat layer is provided on the layer B can be employed. In a case of three-layer laminated film, a simple three-layer lamination structure of layer A/layer B/layer A, a lamination structure wherein a coating layer is provided on the surface of one of the layers A or a lamination structure wherein coating layers are provided on the surfaces of both the layers A (on both surfaces of the laminated film) etc. can be employed. In this case, the thickness of the layer A is preferably in the range of 0.1 to 1.5 μm, and the thickness of the coating layer is preferably about 0.1 μm. In a case of four or more layer laminated film, since basically the number of the layer B (intermediate layer) in the above three-layer laminated film merely increases, the relationship in position between the layer A and the coating layer is the same as that of the three-layer laminated film.

In such a laminated film, the weight average diameter of the organic particles "d" (nm) and the thickness of a layer containing the organic particles "t" (nm) preferably satisfies the equation:

$$0.1\ d \leq t \leq 100\ d.$$

More preferable relationship between the "d" and the "t" is in the range represented by the equation:

$$0.2\ d \leq t \leq 10\ d.$$

By controlling the relationship between the "d" and the "t" in such a range, better scratch resistance, running ability, running durability, abrasion resistance and dubbing resistance can be obtained.

Further, in the case where the aforementioned agglomerated particles are added, the organic particles and the agglomerated particles may be contained in the same layer or may be contained in respective layers different from each other. The following cases (1) and (2) are particularly preferred from the viewpoint of improvement of the scratch resistance and the dubbing resistance.

(1) case where the organic particles and the agglomerated particles are contained in the same layer of at least one outermost layer of the film, and the thickness of the layer "t" and the particle diameter of the organic particles "d" satisfies $0.2\ d \leq t \leq 10\ d$, preferably $0.5\ d \leq t \leq 5\ d$, more preferably $0.5\ d \leq t \leq 3\ d$ (2) case where the thickness of the layer "t" containing the organic particles and the particle diameter of the organic particles "d" satisfies $0.2\ d \leq t \leq 10\ d$, preferably $0.5\ d \leq t \leq 5\ d$, more preferably $0.5\ d \leq t \leq 3\ d$, and a layer containing the agglomerated particles exists on the outer side of the layer containing the organic particles as an outermost layer, and the thickness of the outermost layer is in the range of 0.005 to 1 μm, preferably in the range of 0.01 to 0.5 μm, more preferably in the range of 0.02 to 0.3 μm Although the polymer of a layer other than the layer containing the above organic particles in the laminated film according to the present invention is not particularly restricted, the polymer is preferably a polyester. Although the polyester is not particularly restricted, a polyester containing at least one of ethylene terephthalate, ethylene α, β-bis(2-chlorophenoxy)ethane-4,4'-dicarboxylate and ethylene 2,6-naphthalate as its main constituent is particularly preferable, because the scratch resistance and the dubbing resistance obtained can be further improved. Among these polyesters, a polyester containing ethylene terephthalate as its main constituent is particularly preferred to further improve the scratch resistance and the dubbing resistance.

Particles may be contained in this polymer forming a layer other than the layer containing the organic particles in the laminated film. As such particles, calcium carbonate, alumina, silica, titanium and carbon black particles can be used.

The intrinsic viscosity of the layer containing the organic particles is preferably not less than 0.75, more preferably not less than 0.8. When the intrinsic viscosity of the layer containing the organic particles is not less than 0.75, even if in a case where FF/REW running is repeatedly carried out, scratches are hardly generated on the surface of the base film of a magnetic tape, and therefore, particularly the running durability can be greatly improved when the FF/REW running speed is increased.

Where, in order to control the intrinsic viscosity of the layer containing the organic particles to a condition of not less than 0.75, it is preferred that the intrinsic viscosity of the pellets before molten and extruded is not less than 0.9.

In the present invention, although a number of protrusions are formed on the film surface by the organic particles, a ratio Q/P of the number Q of the protrusions having a diameter of not less than 0.7 μm to less than 2.6 μm to the number P of the protrusions with a diameter of not less than 0.2 μm to less than 0.7 μm is preferably in the range of 1/50 to 1/10,000, more preferably in the range of 1/100 to 1/3,000, and further more preferably in the range of 1/200 to 1/1,000, in order to obtain a better winding property and achieve a much higher yield in slitting process of the film. As a method for forming such protrusions, a method for using at least two kinds of particles having different distributions of particle diameter together is preferred to obtain an excellent running durability. In this case, as long as the crosslinked organic polymeric particles satisfying the aforementioned conditions are used, the particles having the same composition can be employed and the particles having compositions different from each other can be employed.

As to the method or the timing for adding the crosslinked organic polymeric particles to polyester, a known method, for example, a method for adding the particles to reaction system of polyester in a formation of powder or glycol slurry or a method for kneading the particles into polyester in a formation of powder or a slurry using a low boiling point solvent can be employed. Among these methods, a method for kneading the particles into polyester in a formation of a slurry of water or organic compound having a boiling point of not higher than 200° C. is preferred to obtain a good dispersion condition of the particles. In this case, it is further preferred to use a vent-type forming apparatus for deaeration.

In the slurry of crosslinked polymeric particles, an anionic interfacial active agent such as sodium dodecylbenzene sulfonate or sodium lauryl sulfate, a nonionic interfacial active agent such as polyoxyethylenenonilphenylether or polyethylene glycol monostearate, or a protective agent such as polyvinyl pyrolidone, polyvinyl alcohol or carboxylmethylcellulose is preferably contained from the viewpoint of particle dispersion property. The content of the protective agent relative to the crosslinked polymeric particles is preferably in the range of 0.01 to 10% by weight, more preferably in the range of 0.1 to 5% by weight.

Further, although the concentration of the slurry of crosslinked polymeric particles with water and/or organic compound having a boiling point of not higher than 200° C. is not particularly restricted, the content of the water and/or the organic compound having a boiling point of not higher than 200° C. relative to the polymer is preferably in the range of not less than 2% by weight to not more than 30% by weight, and more preferably in the range of not less than 2% by weight to not more than 20% by weight. Such a condition is preferred because the dispersion property of the particles in the polymer is good and the intrinsic viscosity of the polymer does not decrease.

A process for producing such a laminated film as described above will be concretely explained.

First, after polyester pellets are blended at a predetermined rate and dried, the pellets are supplied to known extruders for melting the pellets and laminating the molten polymers, the polymers are delivered out from a die with a slit in a form of a sheet, and the sheet is cooled and solidified on a casting roll to make a non-stretched film. Namely, the polymers are laminated using two or more extruders and a manifold or a feed block for two or more layers (for example, a feed block having a rectangular laminating portion), a sheet having two or more layers is delivered out from a die, and the sheet is cooled to make a non-stretched film. In this process, it is effective to provide a static mixer and a gear pump in the polymer path. Further, it is effective to control the melting temperature of the extruder for extruding the polymer of the outermost layer to a temperature lower than that for the base layer by 5°–10° C.

Next, the non-stretched film is biaxially stretched and biaxially oriented. As the stretching process, a sequential biaxially stretching process or a simultaneous biaxially stretching process can be used. However, a sequential biaxially stretching process for firstly stretching in the longitudinal direction, thereafter stretching in the transverse direction, dividing the longitudinal stretching into three or more stages, and controlling the total longitudinal draw ratio within the range of 3.0 to 6.5 times, is particularly preferred. Although the temperature for the longitudinal stretching varies depending the kind of polyester and therefore cannot be decided to a specified temperature, usually it is effective to control the temperature of the first stage in the range of 50° to 130° C. and the temperature of the succeeding stages at a temperature higher than the temperature of the first stage. The stretching speed in the longitudinal direction is preferably in the range of 5000 to 50000 %/min. Generally, a process for using a stenter is employed for the transverse stretching. The draw ratio is preferably in the range of 3.0 to 5.0 times. The stretching speed in the transverse direction is preferably in the range of 1000 to 20000 %/min, and the temperature thereof is preferably in the range of 80° to 160° C. Next, the stretched film is heat treated. The temperature of the heat treatment is preferably in the range of 170° to 220° C., particularly in the range of 180° to 210° C., and the time is preferably in the range of 0.2 to 20 seconds.

Next, methods for determining the characteristics in the present invention and estimating the effects according to the present invention will be explained.

(1) Weight average diameter of particles:

Photographs of the organic particles in the polymer or the film are taken (size of the photograph: 8 cm×10 cm, number of the photographs: 30) observing by an electron microscope at a magnification of 20,000 to 50,000, the equivalent sphere diameter of the organic particles is determined, and the weight average diameter (d) is determined using the equivalent sphere diameter. Where, the equivalent sphere diameter means a diameter of a sphere having the same volume as that of the particle.

(2) Strength of particle ($S_{10}$):

The deformation is measured using a small compression tester (MCTM-201; produced by Shimadzu Seisakusyo Corporation) by applying a load of 0 to 1 gf at a loading speed of 0.0145 gf/s. $S_{10}$ is calculated from a load P (kgf) resulted when the particle is deformed by 10% using the aforementioned equation (2) (this measurement is repeated by 10 times and the mean value of the 10 times measurements is defined as $S_{10}$).

(3) Volume shape factor of particle:

Very thin samples having a thickness of about 0.3 μm are prepared from a biaxially oriented film according to the present invention on the respective cross sections in the longitudinal and transverse directions, using an apparatus for making a very thin film. Then, the respective samples are observed by a transmission type electron microscope and number average diameters of the observed particles in the longitudinal, transverse and thickness directions are determined (the respective diameters are indicated as "a", "b" and "c"). The volume of the particle (V) is defined by the following equation (4) and the maximum diameter of the particle in a plane of projection (D) is defined by the following equation (5). The volume shape factor "f" is calculated from the aforementioned equation (3).

$$V = 4/3 \, \pi \cdot a \cdot b \cdot c \quad (4)$$

$$D = \max(a, b, c) \quad (5)$$

(4) Content of particles:

The film is treated with a solvent which dissolves the resin constituting the film (for example, polyester) but which does not dissolve the particles, and the particles are separated from the resin by centrifugation. The content of the particles is defined as the ratio of the weight of the separated particles to the total weight of the film (% by weight). Alternatively, as needed, the determination may be carried out by utilizing infrared spectrophotometry.

(5) Average height, Number and Relative standard deviation of height distribution of protrusions formed on film surface:

The height data of the protrusions measured with a two beam and two detector type scanning electron microscope (ESM-3200; produced by Elionics Corporation) and a cross section measuring apparatus (PMS-1; produced by Elionics Corporation) by scanning the surface of the film setting the planar portion of the surface as the base (height 0) is transferred to an image processor (IBAS-2000; produced by Karlzuis Corporation), and an image of the protrusions on the film surface is reconstructed on the display of the image processor. Then, the circle equivalent diameter is determined from the area data of the individual particle obtained by processing the portion of the protrusion in a binary condition in the reconstructed image, this circle equivalent diameter is defined as the average diameter of the particle. Further, the highest value among each height of the protrusion portions processed in a binary condition is defined as the height of the protrusion, and this determination is repeated on the respective protrusions. The determination is repeated 500 times changing measuring portions, the average value of the heights of protrusions measured is defined as the average height of protrusions. Further, the standard deviation of the height distribution is determined from the height data of the respective protrusions. The value obtained by dividing the determined standard deviation by the above average height is defined as the relative standard deviation. The magnification of the scanning electron microscope (SEM) is 1000 to 8000 times. In some cases, the above data obtained by the SEM may be substituted by the data obtained by using a high precision light interference type three dimensional surface analyzer (TOPO-3D produced by WYKO Corporation; objective lens: 40–200 magnifications, effective to use a high level image dissector type camera).

(6) Thickness of lamination:

In a case where the particles contained in the film at the highest density is organic polymeric particles, the thickness of the laminated layer is determined by measuring the depth profile of the particle density by XPS (X-ray photoelectron spectrum), IR (infrared spectroscopic analysis) or a confocal microscope while etching from the surface. In the surface layer of the film wherein a layer is laminated on one surface of the film, the particle density is low because of the boundary of the surface, and the particle density increases as distanced far from the surface.

In the film wherein a layer is laminated on one surface of the film according to the present invention, the particle density becomes the maximum at a depth [I] and thereafter decreases again. Based on this particle density curve, a depth [II], at which the particle density becomes half of the maximum value, is defined as the thickness of the laminated layer (where, II>I). Further, with respect to other laminated films, the thickness is determined by analyzing in a similar manner from a portion beginning to indicating a particle density. In the case where inorganic particles are contained, the ratio of the density of the element originating from the particles contained at the highest density in the film to the density of the carbon in the polyester ($M^+/C^+$) determined by using secondary ion mass spectrum (SIMS) is defined as the particle density, and the analysis is carried out in the depth (thickness) direction from the surface of polyester A layer. The thickness of the lamination is determined in a manner similar to that described above. Further, the thickness also can be determined by observing the cross section of the film or using a level difference measuring apparatus for thin film.

(7) Parameter of surface roughness Ra, Rt:

The parameter of surface roughness is measured using a high-accuracy level difference measuring apparatus for thin film (ET-10 produced by Kosaka Kenkyusyo Corporation). Ra is center line average height, and Rt is maximum height and is represented by the distance between the highest and deepest peaks in the roughness curve. The measuring conditions are as follows, and the mean value of 20 measurements is defined as the parameter of surface roughness.

Radius of the tip of probe: 0.5 μm

Load of the probe: 5 mg

Measuring length: 1 mm

Cut off: 0.08 mm

The detail of the respective parameters is shown in, for example, "Method for determining and estimating surface roughness" by Jiro Nara (Sogo Gijutsu Center, 1983). Further, meanings of Ra and Rt are defined in JIS-B-0601 and ISO-468-1982 (the Rt is represented as Rmax in the JIS and as Ry in the ISO).

(8) Intrinsic viscosity of laminated layer (η: dl/g):

The laminated layer is cut off from a non-stretched film melt-extruded from a die, and after a predetermined amount of sample thereof is sampled, the intrinsic viscosity is calculated by the following equation (6) from a solution viscosity determined in a condition where the sample is dissolved in orthochlorophenol and at a temperature of 25° C.

$$\eta_{SP}/C=[\eta]+K[\eta]^2 \cdot C \quad (6)$$

Where, $\eta_{SP}$=(solution viscosity/solvent viscosity)−1, C is the weight of dissolved polymer per 100 ml of solvent (g/100 ml, usually 1.2), K is Huggins' constant (0.343), and the solution viscosity and solvent viscosity are measured by using an Ostwald's viscometer.

(9) Primary particle diameter and Secondary particle diameter of agglomerated particles:

A cross section of a film is observed by using a transmission type electron microscope (TEM) at a magnification of not less than 500,000 times. The thickness of a sample for the observation by TEM is about 100 nm. The sample is observed and determined at fields of not less than 100 changing the measuring field. The primary particle diameter agglomerated particles is determined from a minimum unit of particle which cannot be further divided, and the secondary particle diameter of agglomerated particles is determined from a agglomerated unit, as a mean value of diameters of equivalent circles of the observed units, respectively.

(10) Young's modulus:

Young's modulus is determined at 25° C. and 65% RH using a tensile tester, based upon the method defined in JIS-Z-1702.

(11) Molecular orientation at film surface:

The measurement is carried out by using a light source of sodium D ray (wave length: 589 nm) and using an Abbe refractometer. Methylene iodide is used as the mount liquid, and the measurement is carried out under the conditions of a temperature of 25° C. and a humidity of 65% RH. When the refractive indexes in the longitudinal, transverse and thickness directions are represented by N1, N2 and N3, respectively, the biaxial orientation of the polymer can be represented by the condition that the absolute value of (N1−N2) is not more than 0.07 and N3/{(N1+N2)/2} is not more than 0.95. The refractive index may be measured by laser type refractometer. Further, if it is difficult to determine by the above method, total reflection laser Raman method can be employed. In the total reflection laser Raman method, the total reflection Raman spectrum is measured by Ramanor U-1000 Raman system produced by Jobin-Yvon Corporation, for example, in the measurement of polyethylene terephthalate, the fact, that the polarimetry ratio of the band intensity ratio of 1615 cm$^{-1}$ (skeletal vibration of benzene ring) and 1730 cm$^{-1}$ (stretching vibration of carbonyl group) corresponds to the molecular orientation, can be utilized. (Where, the polarimetry ratio is, for example, ratio of YY/XX. YY: the polarization direction of the laser is set to Y and Raman ray parallel to the Y is detected. XX: the polarization direction of the laser is set to X and Raman ray parallel to the X is detected.) The biaxial orientation of the polymer can be determined by changing the parameter obtained from the Raman method to the refractive indexes in the longitudinal and transverse directions, and calculating the absolute values thereof and the difference therebetween. In such a measurement, the measuring conditions are as follows.

① Light source: argon ion laser (5,145 Å)

② Setting of sample:

The film surface is pressed onto a total reflection prism, and the incident angle of laser into the prism (angle relative to the thickness direction of the film) is set to 60 degrees.

③ Detector:

PM: RCA31034/Photon Counting System (Hamamatsu C1230) (supply: 1600 V)

④ Measuring conditions:

Slit: 1000 μm

Laser: 100 mW

Gate time: 1.0 sec

Scan speed: 12 cm$^{-1}$/min

Sample interval: 0.2 cm$^{-1}$

Repeat time: 6

(12) Coefficient of dynamic friction at a high running speed (μk):

The film is slitted to prepare a tape with a width of ½ inch. The tape is set in a tape running tester (TBT-300D/H;

produced by Yokohama System Kenkyusyo Corporation) and is run under a condition of 25° C. and 65% RH, and the coefficient of the dynamic friction between the tape and a guide pin is determined by the following equation (7).

$$\mu k = (1/\theta) \times \log (T_2/T_1)$$

Where, $T_1$ is the entrance side tension and $T_2$ is the exit side tension. the diameter of the guide pin is 6 mm φ, the material of the guide pin is SUS27 (surface roughness: 0.2 S), the winding angle is 60 degrees, the running speed is 250 m/min. and $T_1$ is 90 g.

In the measurement of a friction coefficient determined not at a high running speed, i.e., at a low running speed, measuring conditions are as follows (in the tables of examples described later, this is indicated merely as "μk" and is not indicated as "coefficient of dynamic friction at a high running speed").

Winding angle: 180 degrees
Running speed: 3.3 cm/sec.

(13) Abrasion resistance:

The tape made by slitting the film at a width of ½ inch is brought into contact with a guide roll of stainless steel SUS-304 at a winding angle of 60 degrees, a running speed of 250 m/min., and a tension of 95 g over a length of 500 m, and the abrasion resistance is ranked by the amount of white powder generating on the surface of the guide roll as follows. Ranks A and B are determined acceptable.

Rank A: There is no generation of white powder.
Rank B: There is a small amount of white powder.
Rank C: There is a slightly large amount of white powder.
Rank D: There is a large amount of white powder.

(14) Scratch resistance of magnetic surface:

A video tape sold on the market is wound onto a pin with a diameter of 7 mm in a condition where the magnetic surface is placed into the surface side of the wound tape, a tension of 100 g is applied and the longitudinal direction of the tape is directed to the circumferential direction of the pin. Then, a sample film slitted at a width of ½ inch is wrapped on the wound vide tape at a winding angle of 120 degrees and a tension of 50 g, and the sample film is run and turned back ten times by a length of 5 cm at a running speed of 200 cm/min. The scratches generated on the magnetic surface in the running of the sample film are observed by a differential interference microscope at a magnification of 50 times. In a case where the scratches almost are not generated, the scratch resistance of magnetic surface is determined to be "good", and in a case where the scratches of not less than 20 are generated, the scratch resistance of magnetic surface is determined to be "not good".

(15) Scratch resistance:

The film is slitted into a tape with a width of ½ inch, and using a tape running tester, the slitted sample is run on the guide pin (surface roughness: Ra=100 nm) (running speed: 250 m/min, running times: 1 pass, winding angle: 60 degrees, running tension: 90 g). After the running, the scratches resulted on the film surface are observed by a microscope. If the number of the scratches having a width of not less than 1 μm per the width of the tape is less than 2, the scratch resistance is determined to be "excellent". If the number of the scratches is not less than 2 and less than 10, the scratch resistance is determined to be "good". If the number of the scratches is not less than 10, the scratch resistance is determined to be "not good". Although the "excellent" rank is desired, the "good" rank is practically usable.

(16) Dubbing resistance:

A magnetic coating solution with the following composition is coated on the film by using a gravure roll and the coated magnetic layer is dried and magnetically oriented. After the coated film is calendered by a small-sized test calendering apparatus (steel roll/nylon roll; 5 stages) at a temperature of 70° C. and a line pressure of 200 kg/cm, the film is cured at a temperature of 70° C. for 48 hours. The film is slitted to a tape with a width of ½ inch to make a pancake. The tape taken from the pancake is incorporated into a VTR cassette by a length of 250 m to make a VTR cassette tape.

(Composition of magnetic coating solution)(All parts are by weight.)

Co-containing iron oxide: 100 parts
Vinyl chloride/vinyl acetate copolymer: 10 parts
Polyurethane elastomer: 10 parts
Polyisocyanate: 5 parts
Lecitin: 1 parts
Methylethylketone: 75 parts
Methylisobutylketone: 75 parts
Toluene: 75 parts
Carbon black: 2 parts
Lauric acid: 1.5 parts 100% chromatic signal generated by a television testing wave generator is recorded in the above tape using a domestic VTR, and chromatic S/N is determined from the regenerated signal using a color video noise measuring apparatus and the obtained data is referred to as "A". On the other hand, the same signal is recorded on the pancake of a master tape, the recorded signal is dubbed to the same sample tape (non-recorded) as that for the measurement of "A" using a video soft high-speed print system (sprinter) of magnetic field transfer type, and the chromatic S/N of the signal-transferred tape is measured in the same manner as that in the measurement of "A", and the obtained data is referred to as "B". If the reduction of the chromatic S/N in this dubbing (A-B) is less than 3 dB, it is determined to be "excellent". If the reduction of the chromatic S/N is in the range of not less than 3 dB and less than 5 dB, it is determined to be "good", and if the reduction of the chromatic S/N is not less than 5 dB, it is determined to be "not good". The rank "excellent" is desirable, but even the rank "good" is sufficient for practical use.

(17) Running durability at the time of FF/REW:

The video tape prepared in the above item (16) is incorporated into a VTR cassette, and using a domestic video tape recorder, the cassette tape is fast fed (FF) and rewound (REW) repeatedly 100 times. The amount of chipped powder adhering to a pin in the video tape recorder is observed and the running durability is determined by the following criteria.

There is no chipped powder adhering: "excellent"
There is a small amount of powder, but there is no problem in practical use for video tape: "good"
There is a large amount of powder and it is impossible to use it in most of uses for video tape: "not good"

(18) Winding property:

The film is wound into a film roll with a width of 1,000 mm and a length of 18,000 m (winding speed: 300 m/min), the end surfaces are determined in detail with respect to telescoping (shifting) and longitudinal wrinkles, and the result is determined as follows. If the amount of the shifting at the end surface of the film roll (shifting in the width direction) is less than 0.5 mm and no defect such as longitudinal wrinkles occurs even after the roll is placed for more than 24 hours as it is, it is determined to be "excellent". If the amount of the shifting at the end surface of the film roll is less than 0.5 mm and no longitudinal wrinkles occur immediately after winding and but weak longitudinal wrinkles are slightly recognized after the roll is placed for more than 24 hours as it is, it is determined to be "good". If the amount of the shifting at the end surface of the film roll is not less than 0.5 mm or if longitudinal wrinkles are slightly recognized immediately after winding, it is determined to be "not good". The rank of "excellent" is desired, but even the rank of "good" is sufficient for practical use.

EXAMPLES AND COMPARATIVE EXAMPLES

Preferred examples will be hereinafter explained together with comparative examples.

Example 1

Non-dried polyethylene terephthalate pellets with an intrinsic viscosity of 0.660 and containing water component by 0.3 wt % were molten by using a vent-type twin screw extruder. Ethylvinylbenzene-divinylbenzene copolymer particles (monomer weight ratio; 20/80, after the surface was modified by methacrylic acid of 1 wt % relative to the particles, —COONa was formed by NaOH, and an anion interfacial active agent is used), which was dispersed as a water slurry with a concentration of 20 wt %, the weight average diameter "d" of which was 0.3 μm, d/Dn (Dn: number average diameter) of which was 1.40, which had maximal values at positions of 0.05 μm and 0.3 μm, whose ratio of the number of the particles with a small particle diameter distribution to the number of the particles with a large particle diameter distribution as aforementioned was 1:3, $S_{10}$ of which was 7.5 kgf/mm$^2$, the volume shape factor of which was 0.51, and the thermal decomposition temperature of which was 420° C., was added so that the content thereof was 3 wt % in the polyester. The vent pressure was maintained at a vacuum degree of 10 Torr, the resin was melt extruded at a temperature of 280° C. to obtain a polyethylene terephthalate containing crosslinked polymeric particles (I). The intrinsic viscosity of the polymer obtained was 0.640.

On the other hand, polyethylene terephthalate (II) with an intrinsic viscosity of 0.650 was prepared by a regular method using dimethyl terephthalate of 100 parts by weight, ethylene glycol of 70 parts by weight, magnesium acetate 0.06 part by weight as a catalyst for transesterification, antimony trioxide of 0.03 part by weight as a catalyst for polymerization and trimethylphosphate of 0.03 part by weight as a thermal stabilizer.

Then, the polyethylene terephthalate composition (I) was laminated on the polyethylene terephthalate (II) by co-extrusion process at a temperature of 290° C., and the extruded laminated sheet was cooled and solidified on a casting drum using a electrostatic casting method to form a non-stretched laminated film.

The non-stretched film was stretched in the longitudinal direction at three stretching stages wherein the first stage was at 123° C. and 1.2 times, the second stage was at 126° C. and 1.45 times and the third stage was at 114° C. and 2.3 times. The uniaxially stretched film obtained was stretched in the transverse direction at 111° C. and 3.5 times using a stenter, and then the film was heat treated under a condition of a constant length at 200° C. for five seconds to make a film having a thickness of 8.3 μm (lamination thickness: 0.3 μm). The content of the crosslinked polymeric particles in the outermost layer of the obtained film was 3.0 wt %, Ra was 0.011, Rt was 0.270, the relative standard deviation of the height distribution of the formed protrusions was 0.61, as shown in Table 1. With the properties of the film, the μk was 0.28, the abrasion resistance was Rank A, and the scratch resistance of magnetic surface was good.

In Table 1, "EVB" represents ethylvinylbenzene and "DVB" represents divinylbenzene.

Example 2

In Example 1, when polyethylene terephthalate containing crosslinked polymeric particles (I) was prepared, a polyethylene terephthalate copolymerized with 5-sodium sulfoisophthalic acid component of 0.5 wt % instead of the polyethylene terephthalate used in Example 1, and a particle slurry added with polyvinylpyrolidone (molecular weight: 10,000) at a content of 1 wt % relative to the particles were used to prepare a polyester containing crosslinked polymeric particles in a manner similar to that of Example 1. Then, a laminated film was obtained in a manner similar to that of Example 1. As a result, as shown in Table 1, Ra was 0.011, Rt was 0.212, and the relative standard deviation of height distribution of the formed protrusions was 0.52. As to the film property, μk was 0.30, the abrasion resistance was rank A, and the scratch resistance of magnetic surface was good. This film was excellent particularly in the flatness (Rt/Ra) and had a uniform surface formation.

TABLE 1

|  | Example 1 | Example 2 |
|---|---|---|
| Kind of particle *1 | EVB/DVB | EVB/DVB |
| Composition ratio [Weight ratio] | 20/80 | 20/80 |
| Weight average diameter (μm) | 0.3 | 0.3 |
| $S_{10}$ (kgf/mm$^2$) | 7.5 | 7.5 |
| Degree of crosslinkage (%) | 80 | 80 |
| Thermal decomposition temperature (°C.) | 430 | 430 |
| Content (wt %) | 3.0 | 3.0 |
| Kind of film | laminated film (two layers) | laminated film (two layers) |
| Ra (μm) | 0.011 | 0.011 |
| Rt (μm) | 0.270 | 0.212 |
| Rt/Ra | 24.5 | 19.3 |
| Relative standard deviation of height distribution of protrusions | 0.61 | 0.52 |
| μk | 0.28 | 0.30 |
| Abrasion resistance | A | A |
| Scratch resistance of magnetic surface | good | good |

TABLE 1-continued

| | Example 1 | Example 2 |
|---|---|---|

*1 raw material monomer constituting copolymer

Examples 3–7

The lamination structure of the films, and the diameter, the kind and the addition method of the crosslinked polymeric particles were changed as shown in Table 2. In Example 3, the diameter and the content of the particles were changed as compared with Example 1, and the polymer containing the particles was laminated on both surfaces of polyethylene terephthalate (II) to form a laminated film of a three-layer lamination structure. As a result, good film properties could be obtained. In Table 2, ST represents styrene and EDMA represents ethylene glycol dimethacrylate.

In Example 4, polyethylene terephthalate (I) containing the crosslinked polymeric particles and polyethylene terephthalate (II) were blended to form a single layer film. As a result, both the abrasion resistance and the scratch resistance of magnetic surface were good.

In Example 5, a polyethylene terephthalate containing the crosslinked polymeric particles whose weight average diameter was 0.3 μm (polyethylene terephthalate copolymerized with 5-sodium sulfoisophthalic acid component of 0.5 wt %) and a polyethylene terephthalate containing the crosslinked polymeric particles whose weight average diameter was 0.8 μm were blended, and a laminated film of a two layer lamination structure was formed in a manner similar to that in Example 1. As a result, particularly an excellent running ability ($\mu k$) could be obtained.

In Example 6, ethylene glycol slurry of the crosslinked polymeric particles was added after transesterification, and a single layer film was formed in a manner similar to that in Example 4. As a result, both the abrasion resistance and the scratch resistance of magnetic surface were good.

In Example 7, Al was introduced into the skeleton of the molecule of the crosslinked polymeric particles so that the mole ratio of the Al relative to the carbon in the particles was 0.1, the crosslinked polymeric particles were prepared in such a manner, and a laminated film of a two layer lamination structure was formed in a manner similar to that in Example 1. As a result, the height of the protrusions formed was uniform and good film properties could be obtained.

TABLE 2

| | Example 3 | Example 4 | Example 5 | Example 6 | Example 7 |
|---|---|---|---|---|---|
| Kind of particle *1 | EVB/DVB | ST/EVB/DVB | ST/DBV, ST/DVB | ST/EDMA | ST/DVB |
| Composition ratio [Weight ratio] | 10/90 | 10/20/70 | 15/85, 25/75 | 10/90 | 20/80 |
| Weight average diameter (μm) | 0.45 | 0.5 | 0.3, 0.8 | 0.5 | 0.4 |
| $S_{10}$ (kgf/mm$^2$) | 10.5 | 6.7 | 10.1, 7.0 | 11.2 | 15.5 |
| Degree of crosslinkage (%) | 90 | 70 | 85, 75 | 90 | 80 |
| Thermal decomposition temperature (°C.) | 440 | 425 | 420 | 430 | 430 |
| Content (wt %) | 0.5 | 0.5 | 0.3, 0.1 | 0.5 | 3.0 |
| Kind of film | laminated film (three layers) | single-layer film | laminated film (two layers) | single-layer film | laminated film (two layers) |
| Ra (μm) | 0.013 | 0.014 | 0.012 | 0.014 | 0.013 |
| Rt (μm) | 0.290 | 0.378 | 0.224 | 0.489 | 0.240 |
| Rt/Ra | 22.3 | 27.0 | 18.7 | 34.9 | 18.5 |
| Relative standard deviation of height distribution of protrusions | 0.58 | 0.77 | 0.61 | 0.84 | 0.50 |
| μk | 0.27 | 0.26 | 0.24 | 0.24 | 0.28 |
| Abrasion resistance | A | B | A | B | A |
| Scratch resistance of magnetic surface | good | good | good | good | good |

*1 raw material monomer constituting copolymer

Comparative Example 1

A film was formed in a manner similar to that in Example 4 using spherical silicon dioxide particles having a weight average diameter of 0.45 μm. As a result, as shown in Table 3, the affinity was low, a large amount of particles were fallen, the abrasion resistance was rank C and the scratch resistance of magnetic surface was not good.

Comparative Example 2

A film was formed in a manner similar to that in Example 4 using crosslinked particles prepared by using divinylbenzene sold on the market (divinylbenzene: 55%, ethylvinylbenzene: 40%, ethylbenzene: 5%). The degree of crosslinkage was 55%. As a result, as shown in Table 3, the abrasion resistance deteriorated.

Comparative Example 3

A film was formed in a manner similar to that in Example 4 using titanium dioxide particles having a weight average diameter of 0.6 μm. As a result, as shown in Table 3, particularly the abrasion resistance and the scratch resistance of magnetic surface both deteriorated.

gap of a die to the thickness of the non-stretched film was set

TABLE 3

|  | Comparative Example 1 | Comparative Example 2 | Comparative Example 3 |
|---|---|---|---|
| Kind of particle | silicon dioxide | EVB/DVB | titanium dioxide |
| Composition ratio [Weight ratio] | — | 40/50 | — |
| Weight average diameter (μm) | 0.45 | 0.5 | 0.6 |
| $S_{10}$ (kgf/mm$^2$) | 20.3 | 4.0 | 54.6 |
| Degree of crosslinkage (%) | — | 55 | — |
| Thermal decomposition temperature (°C.) | — | 345 | — |
| Content (wt %) | 0.5 | 0.5 | 0.5 |
| Kind of film | single-layer film | single-layer film | single-layer film |
| Ra (μm) | 0.013 | 0.012 | 0.013 |
| Rt (μm) | 0.321 | 0.295 | 0.291 |
| Rt/Ra | 24.7 | 24.6 | 22.4 |
| Relative standard deviation of height distribution of protrusions | 0.70 | 0.73 | 0.54 |
| μk | 0.27 | 0.31 | 0.27 |
| Abrasion resistance | C | C | D |
| Scratch resistance of magnetic surface | not good | good | not good |

Example 8

θ-type alumina particles were dispersed in ethylene glycol, and polyethylene terephthalate master pellets were prepared by polymerizing the ethylene glycol slurry with terephthalic acid. A water slurry of divinylbenzene particles whose divinylbenzene composition was 81% and whose weight average diameter was 0.55 μm was directly blended with the polyethylene terephthalate pellets and kneaded therewith using a vent-type twin-screw extruder to prepare polyethylene terephthalate master pellets to be used. Further, polyethylene terephthalate master pellets which did not contain particles were also prepared.

These polymers were blended at an appropriate rate (polymer A: non-particle, θ-type alumina particles or divinylbenzene particles, polymer B: non-particle), the blended polymers were dried in a pressure reducing condition at 180° C. for eight hours (3 Torr), and thereafter, were supplied to an extruders No. 1 and No. 2 and molten at 290° C. and 280° C., respectively. These polymers were filtered at a high filtration degree, and then laminated in a rectangular lamination portion at a lamination structure of three layers (A/B/A).

The laminated sheet was cast on a casting drum whose surface temperature was 25° C. using an electrostatic casting method, and the sheet was cooled and solidified on the drum to form a non-stretched film. At that time, the ratio of a slit to 10. The total thickness of the film and the thickness of the polymer layer A were controlled by adjusting the discharge speeds of the respective extruders.

The non-stretched film was stretched in the longitudinal direction at 90° C. and 3.6 times. This stretching was carried out at four stages by utilizing the speed differences between four sets of pair of rollers. The uniaxially oriented film formed was then stretched in the transverse direction using a stenter at a draw speed of 2,000%/min. and a draw ratio of 4.2 times and at a temperature of 105° C., and thereafter, the film was heat treated under a condition of a constant length at 200° C. for five seconds to form a biaxially oriented laminated film having a total thickness of 15 μm and a thickness of the laminated layer of 0.6 μm. The contained particles and the properties of the obtained film were as shown in Tables 4 and 5, and excellent scratch resistance and dubbing resistance could be obtained.

Examples 9 and 10, Comparative Examples 4–6

Changing the kind, particle diameter and 10% deformation strength ($S_{10}$) of the particles, films were formed in a manner similar to that in Example 8. As shown Tables 4 and 5, the film satisfying the ranges specified by the present invention indicated good scratch resistance and dubbing resistance, but the film out of the ranges specified by the present invention could not indicate such good scratch resistance and dubbing resistance.

TABLE 4

| Polymer layer A | | | |
|---|---|---|---|
| Alumina particle | | Organic particle | |
| primary particle diameter (nm) | | Weight average | Thermal decomposition |

|  | Kind of particle | secondary particle diameter (nm) | Main constituent of particle | $S_{10}$ (kgf/mm$^2$) | diameter (μm) | temperature (°C.) | Content (wt %) |
| --- | --- | --- | --- | --- | --- | --- | --- |
| Example 8 | θ-type alumina | 40 300 | divinylbenzene 81% | 8.0 | 0.55 | 420 | 0.3 |
| Example 9 | θ-type alumina | 30 200 | divinylbenzene 81% | 8.0 | 0.3 | 420 | 0.2 |
| Example 10 | θ-type alumina | 40 400 | organosiloxane ($CH_3$—$SiO_{3/2}$) 75% | 25.0 | 0.6 | 400 | 0.5 |
| Comparative Example 4 | — | — | divinylbenzene 55% | 3.5 | 0.6 | 345 | 0.01 |
| Comparative Example 5 | θ-type alumina | 40 300 | — | — | — | — | — |
| Comparative Example 6 | θ-type alumina | 40 350 | divinylbenzene 45% | 2.5 | 0.5 | 340 | 0.3 |

TABLE 5

|  | Lamination structure Lamination thickness (μm) | Scratch resistance | Dubbing resistance |
| --- | --- | --- | --- |
| Example 8 | A/B/A 0.6/13.8/0.6 | excellent | excellent |
| Example 9 | A/B 0.2/7.2 | excellent | excellent |
| Example 10 | single layer 14 | excellent | good |
| Comparative Example 4 | single layer 14 | not good | not good |
| Comparative Example 5 | A/B/A 1/14/1 | not good | not good |
| Comparative Example 6 | A/B 6/5 | not good | not good |

Example 11

A water slurry of divinylbenzene particles whose divinylbenzene composition was 81% and whose weight average diameter was 0.45 μm was directly blended with polyethylene terephthalate pellets and kneaded therewith using a vent-type twin-screw extruder to prepare polyethylene terephthalate master pellets to be used. Further, another polyethylene terephthalate master pellets which did not contain particles were also prepared.

These polymers were blended at an appropriate rate (polymer A: non-particle or divinylbenzene particles, polymer B: non-particle), the blended polymers were dried in a pressure reducing condition at 180° C. for eight hours (3 Torr), and thereafter, were supplied to an extruders No. 1 and No. 2 and molten at 290° C. and 280° C., respectively. These polymers were filtered at a high filtration degree, and then laminated in a recutangular lamination portion at a lamination structure of three layers (A/B/A).

The laminated sheet was cast on a casting drum whose surface temperature was 25° C. using an electrostatic casting method, and the sheet was cooled and solidified on the drum to form a non-stretched film. At that time, the ratio of a slit gap of a die to the thickness of the non-stretched film was set to 10. The total thickness of the film and the thickness of the polymer layer A were controlled by adjusting the discharge speeds of the respective extruders.

The non-stretched film was stretched in the longitudinal direction at 85° C. and 3.5 times. This stretching was carried out at four stages by utilizing the speed differences between four sets of pair of rollers. The uniaxially oriented film formed was then stretched in the transverse direction using a stenter at a draw speed of 2,000%/min. and a draw ratio of 4.0 times and at a temperature of 100° C., and thereafter, the film was heat treated under a condition of a constant length at 200° C. for five seconds to form a biaxially oriented laminated film having a total thickness of 15 μm and a thickness of the laminated layer of 0.5 μm. The contained particles and the properties of the obtained film were as shown in Tables 6 and 7, and excellent scratch resistance and dubbing resistance could be obtained.

Examples 12–14, Comparative Examples 7–9

Changing the kind, particle diameter and 10% deformation strength ($S_{10}$) of the particles, films were formed in a manner similar to that in Example 11. As shown Tables 6 and 7, the film satisfying the ranges specified by the present invention indicated good scratch resistance and dubbing resistance, but the film out of the ranges specified by the present invention could not indicate such good scratch resistance and dubbing resistance.

TABLE 6

| | Polymer layer A | | | | | | |
| --- | --- | --- | --- | --- | --- | --- | --- |
| | Organic particle | | | | | Jointly used particle | |
| | Main constituent of particle | $S_{10}$ (kgf/mm$^2$) | Weight average diameter (μm) | Thermal decomposition temperature (°C.) | Content (wt %) | Kind of particle | Particle diameter (μm) |
| Example 11 | divinylbenzene 81% | 8.0 | 0.45 | 420 | 0.2 | calcium carbonate | 0.8 |
| Example 12 | divinylbenzene 81% | 8.0 | 0.3 | 420 | 0.3 | — | — |

TABLE 6-continued

| | Polymer layer A | | | | | Jointly used particle | |
|---|---|---|---|---|---|---|---|
| | Organic particle | | | | | | |
| | Main constituent of particle | $S_{10}$ (kgf/mm$^2$) | Weight average diameter (μm) | Thermal decomposition temperature (°C.) | Content (wt %) | Kind of particle | Particle diameter (μm) |
| Example 13 | divinylbenzene 80% | 7.8 | 0.6 | 415 | 0.1 | θ-alumina, silica | 0.2 0.5 |
| Example 14 | organosiloxane (CH$_3$—SiO$_{3/2}$) 75% | 20 | 0.5 | 430 | 1.0 | calcium carbonate | 0.8 |
| Comparative Example 7 | — | — | — | — | — | calcium carbonate | 0.8 |
| Comparative Example 8 | divinylbenzene 50% | 3.5 | 0.55 | 345 | 0.01 | — | — |
| Comparative Example 9 | divinylbenzene 45% | 2.5 | 0.6 | 340 | 0.3 | — | — |

TABLE 7

| | Lamination structure Lamination thickness (μm) | Number of protrusions at surface (number/mm$^2$) | Scratch resistance | Dubbing resistance |
|---|---|---|---|---|
| Example 11 | A/B/A 0.5/14/0.5 | 40000 | excellent | excellent |
| Example 12 | A/B 0.2/7.2 | 450000 | excellent | excellent |
| Example 13 | single layer 15 | 15000 | good | excellent |
| Example 14 | single layer 14 | 20000 | good | good |
| Comparative Example 7 | single layer 14 | 4500 | not good | not good |
| Comparative Example 8 | A/B/A 1/14/1 | 1500 | not good | not good |
| Comparative Example 9 | A/B 0.5/8.5 | 20000 | not good | not good |

Example 15

Non-dried polyethylene terephthalate pellets with an intrinsic viscosity of 0.66 was molten by using a vent-type twin screw extruder, and ethylvinylbenzene-divinylbenzene copolymer particles dispersed as a water slurry of 20 wt % which had a weight average diameter of 0.3 μm, $S_{10}$ of 7.5 kgf/mm$^2$ and a volume shape factor of 0.51 were added such that the content of the particles was 3 wt % in the polyester. The vent pressure was maintained at a vacuum degree of 10 Torr, the resin was melt extruded at a temperature of 280° C. to obtain a polyethylene terephthalate containing crosslinked polymeric particles (intrinsic viscosity: 0.64). The polymerization degree of the polymer was increased by a known solid phase polymerization to prepare master pellets with an intrinsic viscosity of 1.20. This polymer was referred to as "thermoplastic resin A". On the other hand, polyethylene terephthalate pellets containing the above particles at a content of 0.1 wt % were prepared, and this polymer was referred to as "thermoplastic resin B" (intrinsic viscosity: 0.65). The thermoplastic resin A was supplied to extruder No. 1 and the thermoplastic resin B was supplied to extruder No. 2, and these polymers were molten at 280° C., the polymers were laminated in a feed block, the laminated sheet was cooled and solidified on a casting drum with a surface temperature of 25° C. using a electrostatic casting method to form a non-stretched laminated film having a two-layer lamination structure of A/B. In this lamination, the desired thickness of the layer A was obtained by adjusting the discharge amount of the extruder No. 1. The non-stretched film obtained was stretched in the longitudinal direction at three stretching stages wherein the first stage was at 123° C. and 1.2 times, the second stage was at 126° C. and 1.45 times and the third stage was at 114° C. and 2.3 times. The uniaxially stretched film obtained was stretched in the transverse direction at 95° C. and 3.5 times using a stenter, and then the film was heat treated under a condition of a constant length at 200° C. for five seconds to make a biaxially oriented laminated film having a total thickness of 9 μm. The particles and the film properties are shown in Tables 8 and 9. The intrinsic viscosity of the layer A was 0.87, and the scratch resistance and FF/REW running durability were excellent and the winding property was good.

Example 16

A small amount of particles having the same composition as that of the particles used in Example 15 and having a weight average diameter of 0.8 μm were used together, and a biaxially oriented laminated film was formed in a manner similar to that of Example 15. Where, the particles having a weight average diameter of 0.8 μm were prepared by producing master pellets having a weight average diameter of 0.8 μm separately from the production of the particles used in Example 15 and increasing the intrinsic viscosity thereof to 1.2 by solid phase polymerization. The content of the particles was controlled by blending two kinds of master pellets containing the respective crosslinked polymeric particles and polyethylene terephthalate pellets containing no particle (intrinsic viscosity: 0.85). As a result, the scratch resistance and FF/REW running durability obtained were excellent, and the winding property was also excellent, as shown in Table 9.

Examples 17–19

Changing the $S_{10}$ and the composition of the crosslinked polymeric particles, biaxially oriented laminated films were formed in a manner similar to that of Example 16 (Examples 17 and 18). In Example 19, the contents of particle 1 and particle 2 and the lamination thickness were changed. In any Examples, good film properties could be obtained as shown in Table 9.

Example 20

Crosslinked polymeric particles having a weight average diameter of 0.45 μm were used instead of the particles used in Example 15, and a biaxially oriented laminated film having a three-layer lamination structure of A/B/A was formed. Particularly, the FF/REW running durability was excellent as shown in Table 9.

Comparative Examples 10 and 11

Using crosslinked polymeric particles having changed $S_{10}$ and weight average diameter, biaxially oriented laminated films having a two-layer lamination structure of A/B were formed in a manner similar to that of Example 15. However, solid phase polymerization was not carried out to the polymer used for the layer A, and the polymer used therefor was a polymer having an intrinsic viscosity of about 0.6. In these Examples, as shown in Table 9, particularly the FF/REW running durability was not good, and the scratch resistance also was not good.

Comparative Example 12

Using spherical silica particles having a weight average diameter of 0.3 μm as shown in Table 8, a biaxially oriented laminated film having a two-layer lamination structure of A/B was formed in a manner similar to that of Example 15. In this Example, as shown in Table 9, particularly the FF/REW running durability was not good because many particles were fallen.

TABLE 8

| | Property of particle (laminated layer A) | | | | | | | |
|---|---|---|---|---|---|---|---|---|
| | Kind of particle | Degree of crosslinkage (%) | $S_{10}$ (kgf/mm²) | Weight average diameter (μm) | | Content (wt %) | | Thermal decomposition temperature (°C.) |
| | | | | Particle 1 | Particle 2 | Particle 1 | Particle 2 | |
| Example 15 | EVB/DVB | 80 | 7.5 | 0.3 | — | 3.0 | — | 420 |
| Example 16 | EVB/DVB | 80 | 7.5 | 0.3 | 0.8 | 1.5 | 0.1 | 420 |
| Example 17 | EVB/DVB | 90 | 10.5 | 0.3 | 0.8 | 1.5 | 0.1 | 440 |
| Example 18 | ST/DVB | 75 | 7.0 | 0.3 | 0.8 | 1.5 | 0.1 | 415 |
| Example 19 | EVB/DVB | 80 | 7.5 | 0.3 | 0.8 | 2.0 | 0.02 | 420 |
| Example 20 | EVB/DVB | 70 | 7.5 | 0.45 | — | 3.0 | — | 410 |
| Comparative Example 10 | EVB/DVB | 60 | 7.0 | 0.3 | — | 3.0 | — | 345 |
| Comparative Example 11 | EVB/DVB | 55 | 4.0 | 0.45 | — | 3.0 | — | 340 |
| Comparative Example 12 | silica | — | 20.3 | 0.3 | 0.8 | 2.7 | 0.2 | — |

TABLE 9

| | Property of film | | | | | | |
|---|---|---|---|---|---|---|---|
| | Lamination structure | Intrinsic viscosity of layer A (dl/g) | t/d | Q/P | Scratch resistance | FF/REW Running durability | Winding property |
| Example 15 | A/B | 0.87 | 0.7 | 1/8000 | excellent | excellent | good |
| Example 16 | A/B | 0.84 | 0.6 | 1/250 | excellent | excellent | excellent |
| Example 17 | A/B | 0.79 | 0.6 | 1/250 | excellent | excellent | excellent |
| Example 18 | A/B | 0.82 | 0.6 | 1/300 | excellent | excellent | excellent |
| Example 19 | A/B | 0.84 | 1.2 | 1/1500 | excellent | excellent | good |
| Example 20 | A/B/A | 0.77 | 1.1 | 1/80 | good | excellent | good |
| Comparative Example 10 | A/B | 0.57 | 0.7 | 1/8000 | not good | not good | good |
| Comparative Example 11 | A/B | 0.61 | 0.7 | 1/70 | not good | not good | good |
| Comparative Example 12 | A/B | 0.78 | 0.7 | 1/350 | good | not good | excellent | could be obtained.

Example 21

Changing the thermal decomposition temperature of the crosslinked polymeric particles as compared with that in Example 15, a biaxially oriented laminated film having a two-layer lamination structure of A/B and having a total thickness of 9 μm was formed in a manner similar to that of Example 15, as shown in Tables 10 and 11. In this Example, the coefficient of dynamic friction at a high running speed was low, and the FF/REW running durability was excellent.

Example 22

Changing the thermal decomposition temperature of the crosslinked polymeric particles as compared with that in Example 16, a biaxially oriented laminated film having a two-layer lamination structure of A/B was formed in a manner similar to that of Example 21, as shown in Tables 10 and 11. In this Example, the coefficient of dynamic friction at a high running speed was low, the FF/REW running durability was excellent, and further the winding property was excellent.

Examples 23–25

Changing the $S_{10}$, the degree of crosslinkage, the composition, the ratio of lamination thickness to particle diameter (t/d) and the thermal decomposition temperature of the crosslinked polymeric particles, biaxially oriented laminated films having a two-layer lamination structure of A/B were formed in a manner similar to that of Example 21, as shown in Tables 10 and 11. In any Example, good film properties

Example 26

Crosslinked polymeric particles having a weight average diameter of 0.45 μm were used instead of the particles used in Example 21, and a biaxially oriented laminated film having a three-layer lamination structure of A/B/A was formed in a manner similar to that of Example 21. Particularly, the FF/REW running durability was excellent as shown in Table 11.

Comparative Examples 13–15

Using crosslinked polymeric particles having the same composition as that of the particles used in Example 21 but having $S_{10}$ of 2.5 kgf/mm² and a degree of crosslinkage of 55% as shown in Table 10, biaxially oriented laminated films having a two-layer lamination structure of A/B were formed in a manner similar to that of Example 21. In these Examples, as shown in Table 11, the coefficient of dynamic friction at a high running speed was high, and the FF/REW running durability was not good. In Example 15, particularly the winding property was not good.

Comparative Example 16

Using spherical silica particles having a weight average diameter of 0.3 μm as shown in Table 10, a biaxially oriented laminated film having a two-layer lamination structure of A/B was formed in a manner similar to that of Example 21. In this Example, as shown in Table 11, particularly the FF/REW running durability was not good because many particles were fallen.

TABLE 10

| | Property of particle (laminated layer A) | | | | | | | |
|---|---|---|---|---|---|---|---|---|
| | Kind of particle | Degree of crosslinkage (%) | $S_{10}$ (kgf/mm²) | Weight average diameter (μm) | | Content (wt %) | | Thermal decomposition temperature (°C.) |
| | | | | Particle 1 | Particle 2 | Particle 1 | Particle 2 | |
| Example 21 | EVB/DVB | 80 | 7.5 | 0.3 | — | 3.0 | — | 415 |

TABLE 10-continued

| | Property of particle (laminated layer A) | | | | | | | |
|---|---|---|---|---|---|---|---|---|
| | Kind of particle | Degree of crosslinkage (%) | $S_{10}$ (kgf/mm$^2$) | Weight average diameter (μm) | | Content (wt %) | | Thermal decomposition temperature (°C.) |
| | | | | Particle 1 | Particle 2 | Particle 1 | Particle 2 | |
| Example 22 | EVB/DVB | 80 | 7.5 | 0.3 | 0.8 | 1.5 | 0.1 | 415 |
| Example 23 | EVB/DVB | 90 | 10.5 | 0.3 | 0.8 | 2.0 | 0.1 | 430 |
| Example 24 | ST/DVB | 75 | 7.0 | 0.3 | 0.8 | 3.0 | 0.2 | 410 |
| Example 25 | EVB/DVB | 80 | 7.5 | 0.3 | 0.8 | 2.0 | 0.02 | 415 |
| Example 26 | EVB/DVB | 80 | 7.5 | 0.45 | — | 3.0 | — | 415 |
| Comparative Example 13 | EVB/DVB | 55 | 2.5 | 0.3 | — | 3.0 | — | 340 |
| Comparative Example 14 | EVB/DVB | 55 | 2.5 | 0.45 | — | 3.0 | — | 340 |
| Comparative Example 15 | EVB/DVB | 55 | 2.5 | 0.2 | — | 3.0 | — | 340 |
| Comparative Example 16 | silica | — | 20.3 | 0.3 | 0.8 | 2.7 | 0.2 | — |

TABLE 11

| | Property of film | | | | | |
|---|---|---|---|---|---|---|
| | Lamination structure | t/d | Q/P | Coefficient of dynamic friction at high running speed | FF/REW Running durability | Winding property |
| Example 21 | A/B | 0.7 | 1/8000 | 0.12 | excellent | good |
| Example 22 | A/B | 0.6 | 1/250 | 0.14 | excellent | excellent |
| Example 23 | A/B | 0.6 | 1/450 | 0.10 | excellent | excellent |
| Example 24 | A/B | 0.9 | 1/300 | 0.14 | excellent | excellent |
| Example 25 | A/B | 1.2 | 1/1500 | 0.17 | excellent | good |
| Example 26 | A/B/A | 1.1 | 1/80 | 0.14 | excellent | good |
| Comparative Example 13 | A/B | 0.7 | 1/8000 | 0.29 | not good | good |
| Comparative Example 14 | A/B | 0.7 | 1/70 | 0.26 | not good | good |
| Comparative Example 15 | A/B | 0.7 | 1/12000 | 0.30 | not good | not good |
| Comparative Example 16 | A/B | 0.6 | 1/350 | 0.17 | not good | excellent |

Although preferred embodiments and examples of the present invention have been described herein in detail, it will be appreciated by those skilled in the art that various modifications and alterations can be made to these embodiments and examples without materially departing from the novel teachings and advantages of this invention. Accordingly, it is to be understood that all such modifications and alterations are included within the scope of the invention as defined by the following claims.

What is claimed is:

1. A biaxially oriented film comprising crosslinked organic particles, whose strength when deformed by 10% ($S_{10}$) is in the range of 3 to 30 kgf/mm$^2$, whose thermal decomposition temperature for causing 10% loss in weight is not lower than 350° C. and whose weight average diameter is in the range of 0.005 to 5 μm, at a content of 0.001 to 20% by weight based on the total weight of the film.

2. The biaxially oriented film according to claim 1, wherein said crosslinked organic particles are crosslinked divinylbenzene copolymer particles.

3. The biaxially oriented film according to claim 1, wherein the degree of crosslinkage of said crosslinked organic particles is not less than 60%.

4. The biaxially oriented film according to claim 1, wherein said biaxially oriented film contains agglomerated particles each having a primary particle diameter of 5 to 150 nm other than said organic particles.

5. The biaxially oriented film according to claim 4, wherein said agglomerated particles are selected from the group consisting of alumina, zirconia, silica and titonia particles.

6. The biaxially oriented film according to claim 5, wherein said agglomerated particles are particles selected from the group consisting of δ-, θ-, η- and γ-alumina particles.

7. A laminated film having at least one layer of a biaxially oriented film containing crosslinked organic particles, whose strength when deformed by 10% ($S_{10}$) is in the range of 3 to 30 kgf/mm$^2$, whose thermal decomposition temperature for causing 10% loss in weight is not lower than 350°

C. and whose weight average diameter is in the range of 0.005 to 5 μm, at a content of 0.001 to 20% by weight based on the total weight of the film.

8. The laminated film according to claim 7, wherein said laminated film is a two-layer laminated film.

9. The laminated film according to claim 7, wherein said laminated film is a three or more layer laminated film and at least one outermost layer of the laminated film comprises said biaxially oriented film.

10. The laminated film according to claim 7, wherein the weight average diameter of said organic particles "d" (nm) and the thickness of the layer containing said organic particles "t" (nm) satisfies the equation:

$$.1d \leq t \leq 100\,d.$$

11. The laminated film according to claim 10, wherein the weight average diameter of said organic particles "d" (nm) and the thickness of the layer containing said organic particles "t" (nm) satisfies the equation:

$$.2d \leq t \leq 10\,d.$$

12. The laminated film according to claim 7, wherein said crosslinked organic particles are crosslinked divinylbenzene copolymer particles.

13. The laminated film according to claim 7, wherein the degree of crosslinkage of said crosslinked organic particles is not less than 60%.

14. The laminated film according to claim 7, wherein said laminated film contains agglomerated particles each having a primary particle diameter of 5 to 150 nm other than said organic particles.

15. The laminated film according to claim 14, wherein said agglomerated particles are selected from the group consisting of alumina, zirconia, silica and titania particles.

16. The laminated film according to claim 15, wherein said alumina particles are selected from the group consisting of δ-, θ-, η- and γ-alumina particles.

17. The laminated film according to claim 14, wherein said organic particles and said agglomerated particles are present at least in an identical outermost layer.

18. The laminated film according to claim 14, wherein a layer containing said agglomerated particles is laminated on a layer containing said organic particles as an outermost layer.

* * * * *